(12) United States Patent
Goto

(10) Patent No.: US 6,657,177 B2
(45) Date of Patent: Dec. 2, 2003

(54) SOLID-STATE IMAGING SYSTEM

(75) Inventor: Hiroshige Goto, Yokohama (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 89 days.

(21) Appl. No.: 09/899,236

(22) Filed: Jul. 6, 2001

(65) Prior Publication Data

US 2002/0005474 A1 Jan. 17, 2002

(30) Foreign Application Priority Data

Jul. 6, 2000 (JP) ........................................ 2000-205422

(51) Int. Cl.[7] .............................................. H01L 27/00
(52) U.S. Cl. .................................... 250/208.1; 348/302
(58) Field of Search ........................... 250/208.1, 204, 250/207, 214 R, 214 LA, 214 LS, 214 SW; 348/294, 332, 295, 296, 297, 300, 301–302, 311, 308, 230.1, 220.1, 221.1, 222.1, 229.1, 281–283; 356/222, 343, 435; 382/312; 358/482–483; 257/215

(56) References Cited

U.S. PATENT DOCUMENTS

| | | | | |
|---|---|---|---|---|
| 4,942,474 A | * | 7/1990 | Akimoto et al. | ............ 348/301 |
| 5,856,686 A | * | 1/1999 | Watanabe et al. | ............ 257/291 |
| 5,933,189 A | * | 8/1999 | Nomura | ...................... 348/302 |
| 6,300,615 B1 | * | 10/2001 | Shinohara et al. | ...... 250/214 R |
| 6,452,633 B1 | * | 9/2002 | Merrill et al. | .............. 348/302 |
| 6,473,538 B2 | * | 10/2002 | Kozuka | ...................... 382/312 |

FOREIGN PATENT DOCUMENTS

| JP | 8-129128 | 5/1996 |
|---|---|---|
| JP | 10-93866 | 4/1998 |

* cited by examiner

Primary Examiner—David Porta
Assistant Examiner—Patrick J. Lee
(74) Attorney, Agent, or Firm—Oblon, Spivak, McClelland, Maier & Neustadt, P.C.

(57) ABSTRACT

In an amplification type solid-state imaging device, output signals of unit cells Pij arranged in a selected row (horizontal line) in the imaging area are read out in sequence and then the average level of the output signals of the unit cells is detected and stored temporarily in a memory. The integrating time of photodiodes in unit cells in each row is set based on the average output level for that row of one frame before, thereby allowing the dynamic range to be expanded on a row-by-row basis without making more complex than necessary the arrangement of the solid-state imaging device.

3 Claims, 8 Drawing Sheets

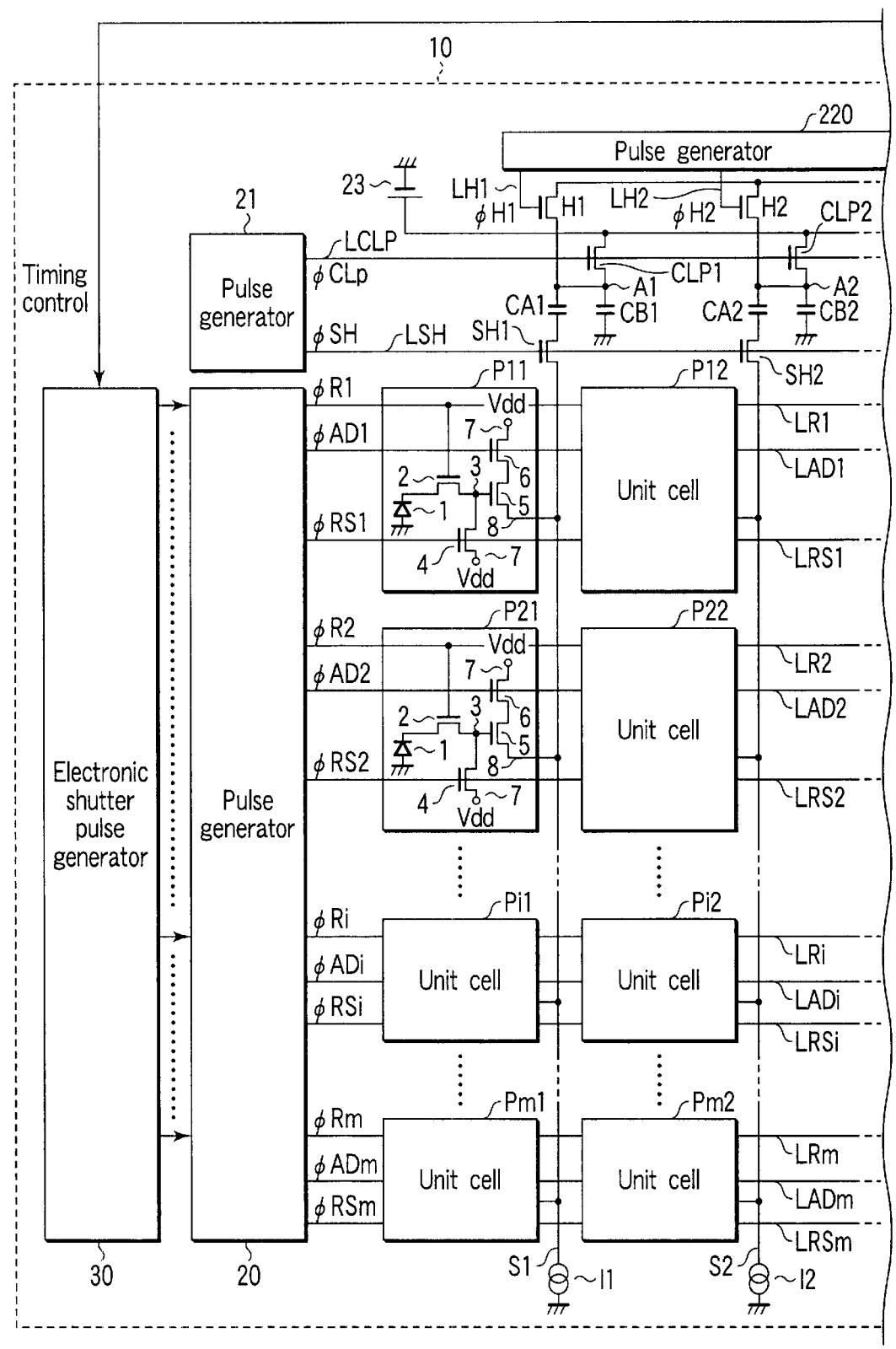
F I G. 1A

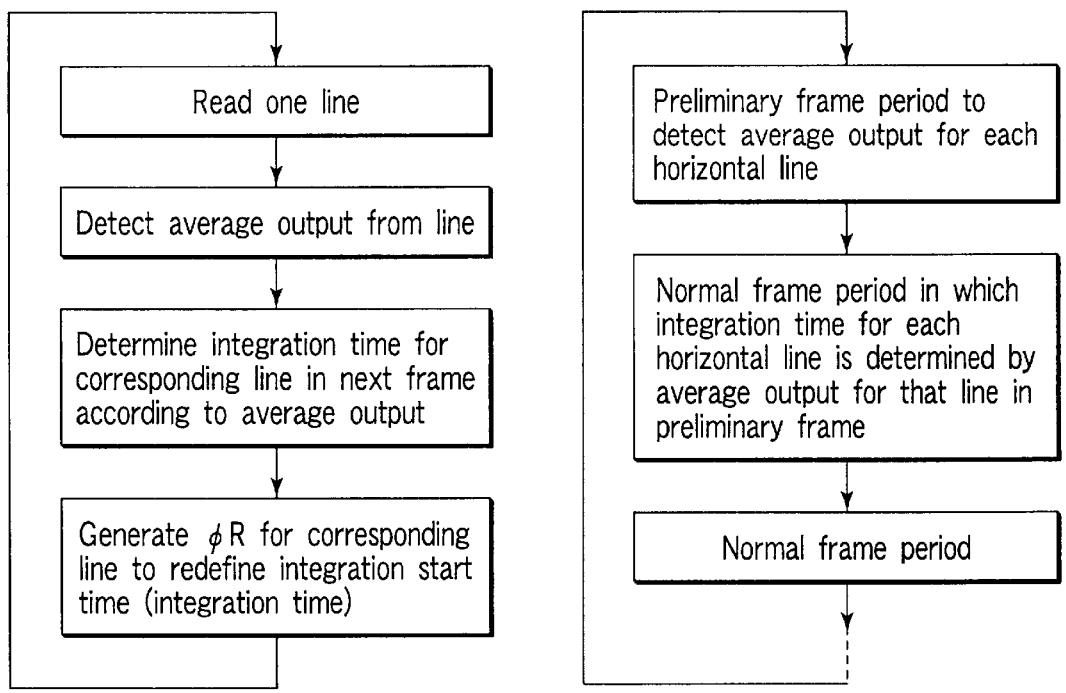
F I G. 2      F I G. 3
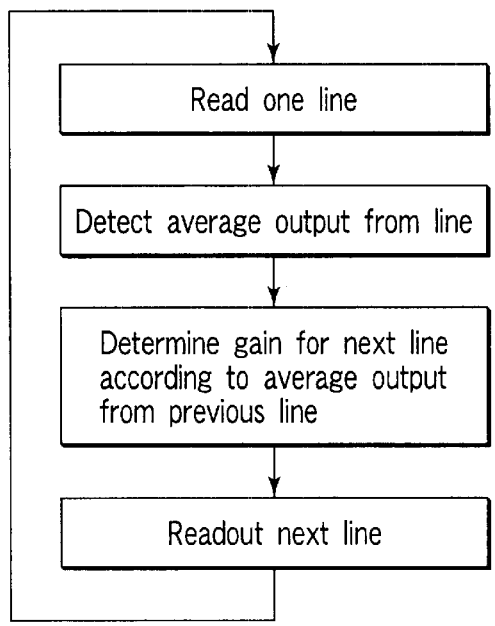
F I G. 5

SOLID-STATE IMAGING SYSTEM

CROSS-REFERENCE TO RELATED APPLICATIONS

This application is based upon and claims the benefit of priority from the prior Japanese Patent Application No. 2000-205422, filed Jul. 6, 2000, the entire contents of which are incorporated herein by reference.

BACKGROUND OF THE INVENTION

1. Field of the Invention

The present invention relates to a solid-state imaging system using a solid-state imaging device and, more specifically, to a solid-state imaging system using a solid-state imaging device of an amplification type provided with a charge detecting circuit for each pixel or cell, which may be used in video cameras and electronic still cameras.

2. Description of the Related Art

Solid-state imaging devices include CCD (charge coupled device)-based solid-state imaging devices and amplification type solid-state imaging devices provided with a charge detecting device for each pixel. To increase the dynamic range, two main approaches have been adopted: one is to allow the photoelectric conversion characteristic to have nonlinearity, and the other is to use an operation of setting the integration time to be less than the frame rate (the time required to read out one frame), i.e., to employ the so-called electronic shutter function.

With conventional CCD solid-stage imaging devices, an electronic shutter operation using vertical overflow drains is often performed for improving the pixel aperture ratio. In such an electronic shutter operation, much structural difficulties are involved in setting different integration times to each pixel on the imaging surface; therefore, all the pixels are often allocated the same integration time. Thus, the integration time will be set so that the brightest pixel will not be saturated. In that case, an output of a pixel on which dim light falls will be buried in noise components because of its insufficient integration time, causing a problem that a sufficient signal-to-noise ratio in the entire image cannot necessarily be obtained.

In contrast, in the amplification type solid-state image device, unlike the CCD solid-stage imaging devices, the charge transfer operation is performed only in the periphery of photodiodes; thus, the power and voltage required of the charge transfer operation become unnecessary and they are suited for use in mobiles which are operated from batteries.

FIGS. 8A and 8B show a schematic arrangement of a conventional amplification type solid-state imaging device. In this exemplary arrangement, one photodiode forms one unit cell.

In FIGS. 8A and 8B, Sj denote vertical signal lines, Ij, current sources, SHj, shift gates, CAj and CBj, capacitances for signal processing, CLPj, clamping gates for removing offset, Hj, line readout gates, LHj, line readout pulse lines, $\phi$Hj, line readout pulses, LADi, address pulse lines, $\phi$ADi, address pulses, LRi, readout pulse lines, $\phi$Ri, readout pulses, LRSi, reset pulse lines, $\phi$RSi, reset pulses, LSH, a shift pulse line, $\phi$SH, a shift pulse, LCLP, a clamp pulse line, $\phi$CLP, a clamp pulse, LCR, a clear pulse line, and $\phi$CR, a clear pulse.

In addition, 20 denotes a pulse generator that generates the pulses $\phi$Di, $\phi$Ri, and $\phi$RSi; 21, a pulse generator that generates the pulses $\phi$SH and $\phi$CLP; 23, a clamping DC power supply; 24, a horizontal signal line; 25, a capacitor attached to the horizontal signal line 24; 26, an output buffer circuit that detects the potential on the horizontal signal line and outputs the detected potential with impedance conversion; 27, an output node; 28, a gate for resetting the potential at the capacitor 25; and 29, a power supply for generating a potential at the reset time. The output voltage of the power supply 29 (assumed to be Vb) is set with the characteristic of the output buffer circuit 26 taken into account. A clear pulse $\phi$CR is applied to the gate 28 before each of the line readout pulses $\phi$Hj is applied to a corresponding one of the line readout gates Hj with the result that the capacitor 25 is fixed at Vb.

The horizontal pulse generator 22 generates the pulses $\phi$Hj and $\phi$CR so that the imaging device is driven to perform a normal horizontal line read operation within each horizontal line period, as shown in FIG. 9.

In the imaging area on the semiconductor substrate, unit cells Pij are two-dimensionally arrayed in m columns and n rows, the subscript i being the row number from 1 to m and j being the column number from 1 to n. For each row of the unit cells, an address pulse line LADi, a readout pulse line Lri and a reset pulse line LRSi are provided in the horizontal direction. Each unit cell Pij is connected to a pulse generator 20 as vertical driving means to receive an address pulse $\phi$ADi, a readout pulse $\phi$Ri, and a reset pulse $\phi$Rsi over the three pulse lines (the address pulse line LADi, the readout pulse line Lri, and the reset pulse line LRSi). For each column of the unit cells Pij, a vertical signal line Sj is provided in the vertical direction. Each unit cell Pij has its output line 8 connected to a corresponding one of the vertical signal lines Sj.

As previously described, the horizontal pulse generator 22 generates the pulses $\phi$Hj and $\phi$CR so that the imaging device is driven to perform a normal horizontal line read operation within each horizontal line period, as shown in FIG. 9.

FIG. 9 illustrates the conventional timing of pulse signals for driving the solid-state imaging device of FIGS. 8A and 8B using a system of non-interlaced scanning.

In this diagram, HBLK denotes a horizontal sync pulse signal the high-level interval of which indicates the horizontal line blanking period. The interval when HBLK is low is the line effective scanning period, during which line readout pulses $\phi$Hj are produced. The line blanking period and the line effective scanning period form one line scanning period (1H). In the line scanning period, a signal is read from each unit cell during the line blanking period and stored in the form of charge at the corresponding capacitor CBj. After that, the line readout transistors Hj are turned on in sequence to connect capacitors 25 and CAj, CBj in parallel to read the stored signal charges.

Next, the read operation of the unit cells Pij will be described in detail with reference to the timing diagram shown in FIG. 9.

Charges produced as a result of photoelectric conversion of light incident on the photodiode 1 are stored in it until the readout transistor 2 is turned on. In the line blanking period, first, at time t=t0, the address pulse $\phi$ADi is set high to turn the address transistor 6 on, thus forming a source follower circuit from the vertical signal line Sj, the current source Ij, and the potential detecting transistor 5 so as to allow the transistor 5 to detect charges at the storage node 3. Thereby, only the potential determined by the gate potential of the transistor 5 corresponding to the amount of charge at the storage node 3 is transferred to the vertical signal line Sj.

At the beginning of the line blanking period, the reset pulse $\phi$Rsi is set high to turn the reset transistor 4 on, which allows the amount of charge resulting from integration of dark current at the storage node 3 to be drained away at the beginning of the line blanking period. Thereby, the storage node 3 is set at the supply voltage (Vdd).

When the amount of charge Qij has been transferred from the photodiode 1 to the storage node 3, the potential V3$ij$ at the storage node is given by $$V3ij = Vdd + Qij/Cij \quad (1)$$

where Cij is capacitance associated with the storage node and Vdd is the supply voltage.

The potential V3$ij$ is detected by the potential detecting transistor 5, so that the potential V8$ij$ on the output line 8 becomes $$V8ij = mV3ij + Voij$$
$$= m(Vdd + Qij/Cij) + Voij$$
$$= mQij/Cij + mVdd + Voij \quad (2)$$

where m is the modulation factor of the transistor (gate) 5 and Voij is the offset voltage determined by variations in the threshold voltage of the transistor 5 and the current source Ij.

With current manufacturing techniques, the modulation factor m can be formed with little variation over the entire wafer, and thus, the modulation factor m may be considered to be approximately constant. However, this is not the case with the offset voltage Voij, which varies from vertical signal line to vertical signal line. Accordingly, the offset voltage needs to be corrected.

Let the voltage of the DC power supply 23 be Vref and consider the potential V8$ij$ on the output line 8 and the potential Vaj at the node Aj to which the capacitors CAj and CBj in the noise canceling circuit are connected together. Let V8$ij$ at time t=t1 immediately after resetting be $$V8ij = mVdd + Voij = V1 \quad (3)$$

At time t=t2 immediately after application of the clamp pulse φCLP, the potential V8$ij$ on the output line 8 remains unchanged from V1, but VAj becomes $$VAj = Vref \quad (4)$$

That is, a potential difference of Vref−V1 is produced across the capacitor CAj. The plate of the capacitor CBj opposite to its grounded plate is at Vref. Next, the readout pulse φRi is set high to turn the readout transistor 2 on, so that the charges Qij stored in the photodiode 1 are transferred to the storage node 3. As a result, at time t=t3, V8$ij$ becomes $$V8ij = mQij/Cij + V1 \quad (5)$$

Thus, the potential Vaj at the node Aj is set at $$VAj = Vref + (mQij/Cij)CAj/(CAj + CBj) \quad (6)$$

After that, the shift pulse φSH is set low to turn the shift transistors SHj off and thereby disconnect the vertical signal lines Sj. The horizontal sync pulse HBLK is then set low. In this state (t=t4), let the amount of charge stored at the capacitors 25 and CBj be Q1 and Q2j, respectively. Then, Q1 and Q2j are given by $$Q1 = CH \cdot Vb \quad (7)$$

$$Q2j = CBj \cdot Vref + (mQij/Cij)CAj \cdot CBj/(CAj + CBj) \quad (8)$$

where CH is the capacitance of the capacitor 25 and Vb is the voltage of the power supply 29.

After that, in the interval when the horizontal sync pulse HBLK is low, the line readout pulse φHj is set high subsequently to setting the clear pulse φCR high to turn the line readout transistor Hj on. Since the capacitors are paralleled, the potential on the horizontal signal line 24 becomes $$(Q1+Q2j)/(CH+CBj) = (CH \cdot Vb + CBj \cdot Vref)/(CH+CBj) + (mQij/Cij)CAj \cdot CBj/((CAj+CBj)(CH+CBj)) \quad (9)$$

As can be seen from equation (9), the potential on the horizontal signal line 24 contains components CAj and CBj that may vary from column to column and a component Cij that may vary from cell to cell, the other components being independent of rows and columns. In other words, Voij that may vary with the threshold voltage and so on is not contained, indicating an effective correction on the potential V8$j$ on the output line 8.

Further, closer examination of equation (9) shows that it does not depend on the absolute values of capacitances but on their ratio except for the term of mQij/Cij. This shows that the output voltage does not depend on the absolute values of the thickness of gate oxides but is determined by the geometrical size ratio among capacitor patterns, which means that the variations in the output voltage can be reduced relatively readily by current manufacturing techniques. The modulation factor m of transistors, which is a variable that can be controlled relatively readily, can be set with little variation and may be considered to be nearly constant. Eventually, therefore, only Cij that may vary from cell to cell will have some effect on the output voltage.

By setting each of the horizontal readout pulses φH1, φH2, φH3, high in sequence with each application of the clear pulse φCR during the low-level period of the horizontal sync pulse HBLK, signals are obtained in time sequence from the output node 27 via the horizontal signal line 24, thereby producing a line of video information.

However, no specific approach to increase the dynamic range for each line (row) in the amplification type solid-state imaging device has been presented heretofore.

BRIEF SUMMARY OF THE INVENTION

According to a first aspect of the present invention there is provided a solid-state imaging system comprising: a solid-state imaging device having an imaging area in which unit cells are arrayed in rows and columns on a semiconductor substrate, each unit cell having a photoelectric conversion storage element for converting an incident light into the form of electric charge and storing the produced charge, a charge readout element for readout the charge stored in the photoelectric conversion storage element, a charge detecting element for detecting the amount of charge readout by the charge readout element, and an address element for activating the charge detecting element;

a vertical driving circuit for driving the charge readout element and the address element of the unit cells for each row of unit cells; signal processing circuits each provided for a respective one of vertical signal lines each arranged for a respective one of the columns of unit cells; horizontal line readout switches each provided for a respective one of the vertical signal lines, for controlling a transfer of an output signal of the corresponding signal processing circuit to a horizontal signal line; a horizontal driving circuit for controlling the horizontal line readout switches to allow the transfer of output signals of the signal processing circuits to the horizontal signal line; and an output circuit for outputting the output signals of the signal processing circuits read out onto the horizontal signal line under the control of the horizontal driving circuit, the solid-state imaging device having an operation mode in which the horizontal driving circuit turns on the horizontal readout switches at substantially the same time so that output signals of the signal processing circuits read out through the switches onto the horizontal signal line are averaged to form a signal of an average level for each row of unit cells and the signal of the average level is outputted from the output circuit, the integration time of the photoelectric conversion storage element in the unit cells or the amplifier gain for the output of the output circuit being set for each row of unit cells on the basis of the average level of the output signal outputted from the output circuit in the operation mode.

In the solid-state imaging system according to the first aspect of the present invention, the integration time for each row of unit cells may be set based on a value obtained by correcting the corresponding average output level in the second operation mode according to a predetermined compression characteristic.

According to a second aspect of the present invention, there is also provided a solid-state imaging system comprising: a solid-state imaging device having an imaging area in which unit cells are arrayed in rows and columns on a semiconductor substrate, each unit cell having a photoelectric conversion storage element for converting an incident light into the form of electric charge and storing the produced charge, a charge readout element for readout the charge stored in the photoelectric conversion storage element, a charge detecting element for detecting the amount of charge readout by the charge readout element, and an address element for activating the charge detecting element; a vertical driving circuit for driving the charge readout element and the address element of the unit cells for each row of unit cells; signal processing circuits each provided for a respective one of vertical signal lines each arranged for a respective one of the columns of unit cells; horizontal line readout switches each provided for a respective one of the vertical signal lines, for controlling a transfer of an output signal of the corresponding signal processing circuit to a horizontal signal line; a horizontal driving circuit for controlling the horizontal line readout switches to allow the transfer of output signals of the signal processing circuits to the horizontal signal line; and an output circuit for outputting the output signals of the signal processing circuits read out onto the horizontal signal line under the control of the horizontal driving circuit, the solid-state imaging device having a first operation mode in which the horizontal driving circuit turns on the horizontal readout switches in sequence during an effective scanning period in a horizontal line period so that the output signals of the signal processing circuits are outputted in sequence through the horizontal signal line from the output circuit and a second operation mode in which the horizontal driving circuit turns on the horizontal readout switches at substantially the same time during the blanking period subsequent to the effective scanning period so that output signals of the signal processing circuits read out through the switches onto the horizontal signal line are averaged to form a signal of an average level for each row of unit cells and the signal of an average level is outputted from the output circuit; and a storage circuit for storing data of the average level of the signal in the second operation mode outputted from the output circuit for each row of unit cells, the integration time of the photoelectric conversion storage element in the unit cells being set for each row of unit cells on the basis of the average level of the signal in the second operation mode.

In the solid-state imaging system according to the second aspect of the present invention, the integration time for each row of unit cells may be set based on a value obtained by correcting the corresponding average output level in the second operation mode according to a predetermined compression characteristic.

In the solid-state imaging system according to the second aspect of the present invention, the integration time in each row of unit cells in the solid-state imaging device may be set based on the average level of the signal in the second operation mode for that row in the second operation mode in the immediately preceding frame period. The integration time for each row of unit cells may be set based on a value obtained by correcting the corresponding average output level in the second operation mode according to a predetermined compression characteristic.

According to a third aspect of the present invention, there is further provided a solid-state imaging system comprising: a solid-state imaging device having an imaging area in which unit cells are arrayed in rows and columns on a semiconductor substrate, each unit cell having a photoelectric conversion storage element for converting an incident light into the form of electric charge and storing the produced charge, a charge readout element for readout the charge stored in the photoelectric conversion storage element, a charge detecting element for detecting the amount of charge readout by the charge readout element, and an address element for activating the charge detecting element; a vertical driving circuit for driving the charge readout element and the address element of the unit cells for each row of unit cells; signal processing circuits each provided for a respective one of vertical signal lines each arranged for a respective one of the columns of unit cells; horizontal line readout switches each provided for a respective one of the vertical signal lines, for controlling a transfer of an output signal of the corresponding signal processing circuit to a horizontal signal line; a horizontal driving circuit for controlling the horizontal line readout switches to allow the transfer of output signals of the signal processing circuits to the horizontal signal line; and an output circuit for outputting the output signals of the signal processing circuits read out onto the horizontal signal line under the control of the horizontal driving circuit, the solid-state imaging device having a first operation mode in which, in a normal frame, the horizontal driving circuit turns on the horizontal readout switches for each row of unit cells in sequence during an effective scanning period in a horizontal line period so that the output signals of the signal processing circuits are outputted in sequence through the horizontal signal line from the output circuit and a second operation mode in which, in a preliminary frame, the horizontal driving circuit turns on the horizontal readout switches at substantially the same time for each row of unit cells so that output signals of the signal processing circuits read out through the switches onto the horizontal signal line are averaged to form a signal of an average level for each row of unit cells and the signal of an average level is outputted from the output circuit; and a storage circuit for storing data of the average level of the signal in the second operation mode outputted from the output circuit for each row of unit cells, the integration time of the photoelectric conversion storage element in the unit cells in each row of unit cells in the first operation mode on the basis of the average level of the signal in the second operation mode for that row in the second operation mode in the preliminary frame followed by the normal frame.

In the solid-state imaging system according to the third aspect of the present invention, the integration time for each row of unit cells may be set based on a value obtained by correcting the corresponding average output level in the second operation mode according to a predetermined compression characteristic.

In the solid-state imaging system according to the third aspect of the present invention, the period of the preliminary frame may be set shorter than that of the normal frame. The integration time for each row of unit cells may be set based on a value obtained by correcting the corresponding average output level in the second operation mode according to a predetermined compression characteristic.

According to a fourth aspect of the present invention, there is further provided a solid-state imaging system comprising: a solid-state imaging device having: an imaging area in which unit cells are arrayed in rows and columns on a semiconductor substrate, each unit cell having a photoelectric conversion storage element for converting an incident light into the form of electric charge and storing the produced charge, a charge readout element for readout the charge stored in the photoelectric conversion storage element, a charge detecting element for detecting the amount of charge readout by the charge readout element, and an address element for activating the charge detecting element; a vertical driving circuit for driving the charge readout element and the address element of the unit cells for each row of unit cells; signal processing circuits each provided for a respective one of vertical signal lines each arranged for a respective one of the columns of unit cells; horizontal line readout switches each provided for a respective one of the vertical signal lines, for controlling a transfer of an output signal of the corresponding signal processing circuit to a horizontal signal line; a horizontal driving circuit for controlling the horizontal line readout switches to allow the transfer of output signals of the signal processing circuits to the horizontal signal line, and an output circuit for outputting the output signals of the signal processing circuits read out onto the horizontal signal line under the control of the horizontal driving circuit, the solid-state imaging device having a first operation mode in which the horizontal driving circuit turns on the horizontal readout switches in sequence during an effective scanning period in a horizontal line period so that the output signals of the signal processing circuits are outputted in sequence through the horizontal signal line from the output circuit and a second operation mode in which the horizontal driving circuit turns on the horizontal readout switches at substantially the same time so that output signals of the signal processing circuits read out through the switches onto the horizontal signal line are averaged to form a signal of an average level for each row of unit cells and the signal of the average level is outputted from the output circuit; an amplifier for amplifying output signals in the first operation mode outputted from the output circuit; and a storage circuit for storing data of the average level of the signal in the second operation mode outputted from the output circuit for each row of unit cells, the gain of the amplifier being set for each row of unit cells on the basis of the signal of the average level in the second operation mode.

In the solid-state imaging system according to the fourth aspect of the present invention, the integration time for each row of unit cells may be set based on a value obtained by correcting the corresponding average output level in the second operation mode according to a predetermined compression characteristic.

In the solid-state imaging system according to the fourth aspect of the present invention, the second operation mode may be carried out during the blanking period subsequent to the effective scanning period, and when amplifying output signals from each row of unit cells in the first operation mode in the amplifier, the gain of the amplifier may be set based on the signal of the average level in the second operation mode for the adjacent row of one row before that row in the same frame. The integration time for each row of unit cells may be set based on a value obtained by correcting the corresponding average output level in the second operation mode according to a predetermined compression characteristic.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIGS. 1A and 1B show a circuit arrangement of a solid-state imaging system embodying the present invention;

FIG. 2 is a flowchart illustrating an example of an operation of the solid-state imaging system of FIGS. 1A and 1B;

FIG. 3 is a flowchart illustrating another example of an operation of the solid-state imaging system of FIGS. 1A and 1B;

FIG. 5 is a flowchart illustrating still another example of an operation of the solid-state imaging system of FIGS. 1A and 1B;

DETAILED DESCRIPTION OF THE INVENTION

A first embodiment of the present invention will be described hereinafter.

Figure 1B:
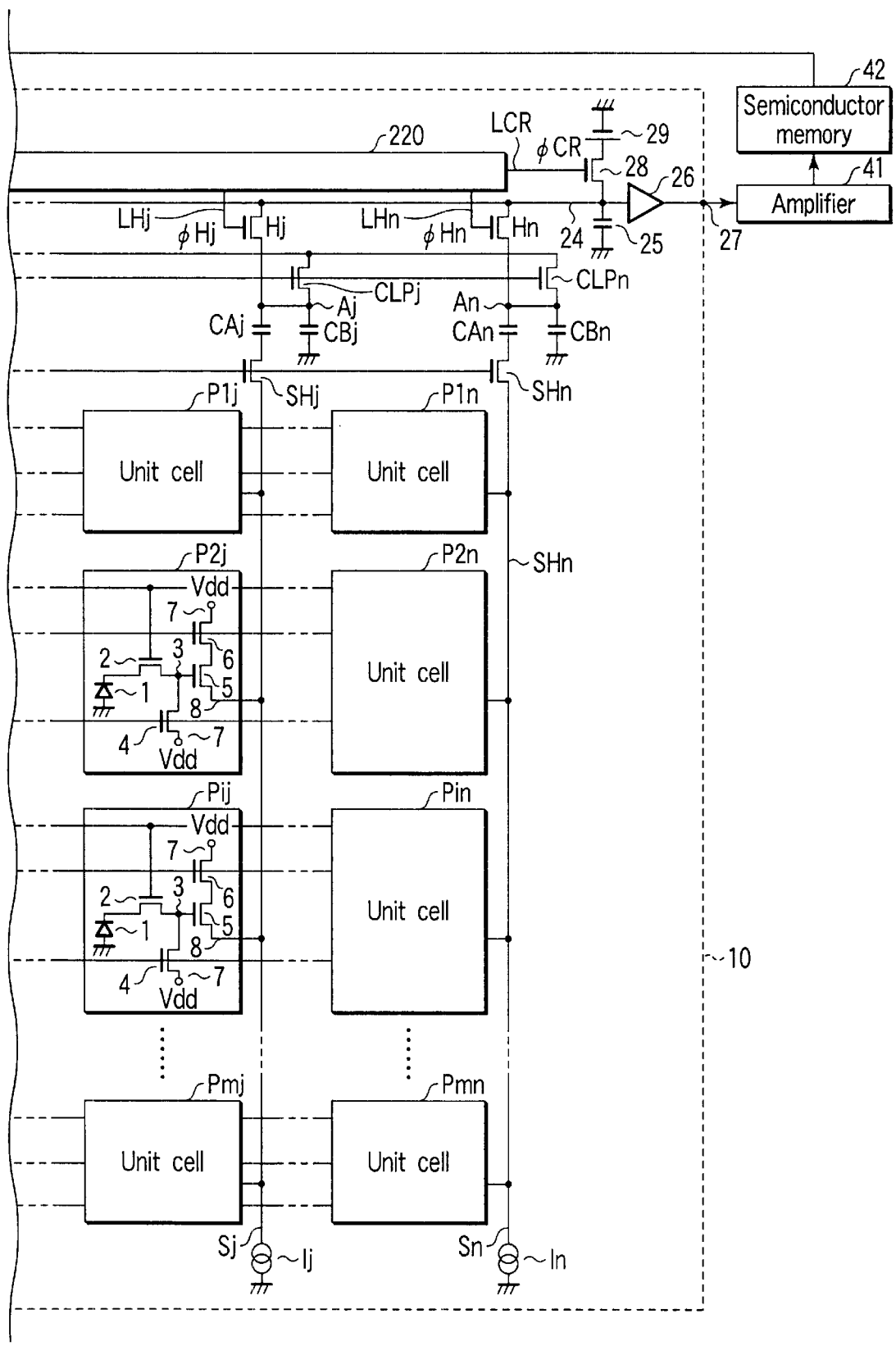

FIGS. 1A and 1B show a solid-state imaging system embodying the present invention.

Figure 8A:
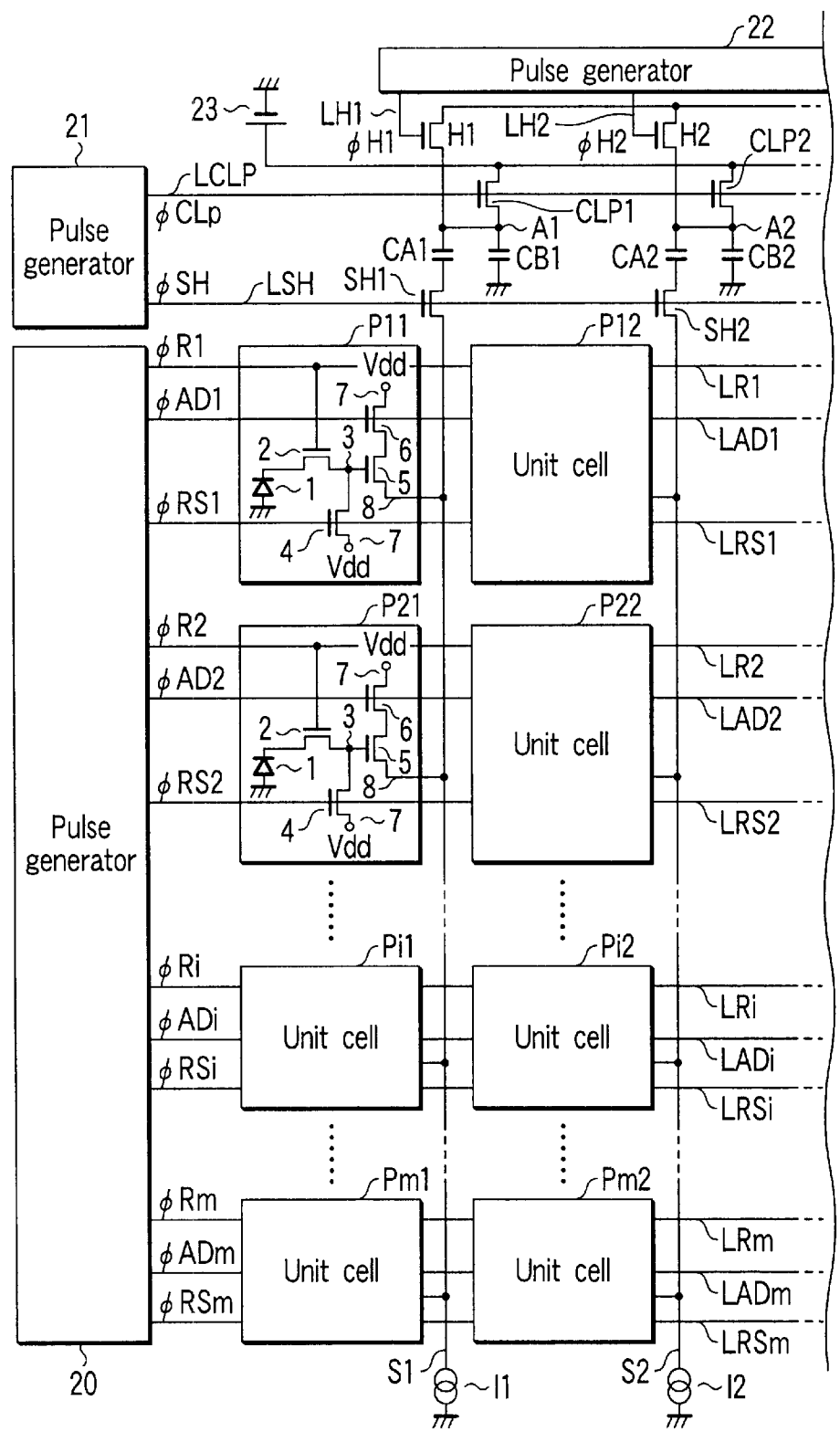
FIGS. 8A and 8B show a circuit arrangement of a conventional amplification type solid-state imaging device.
Figure 8B:
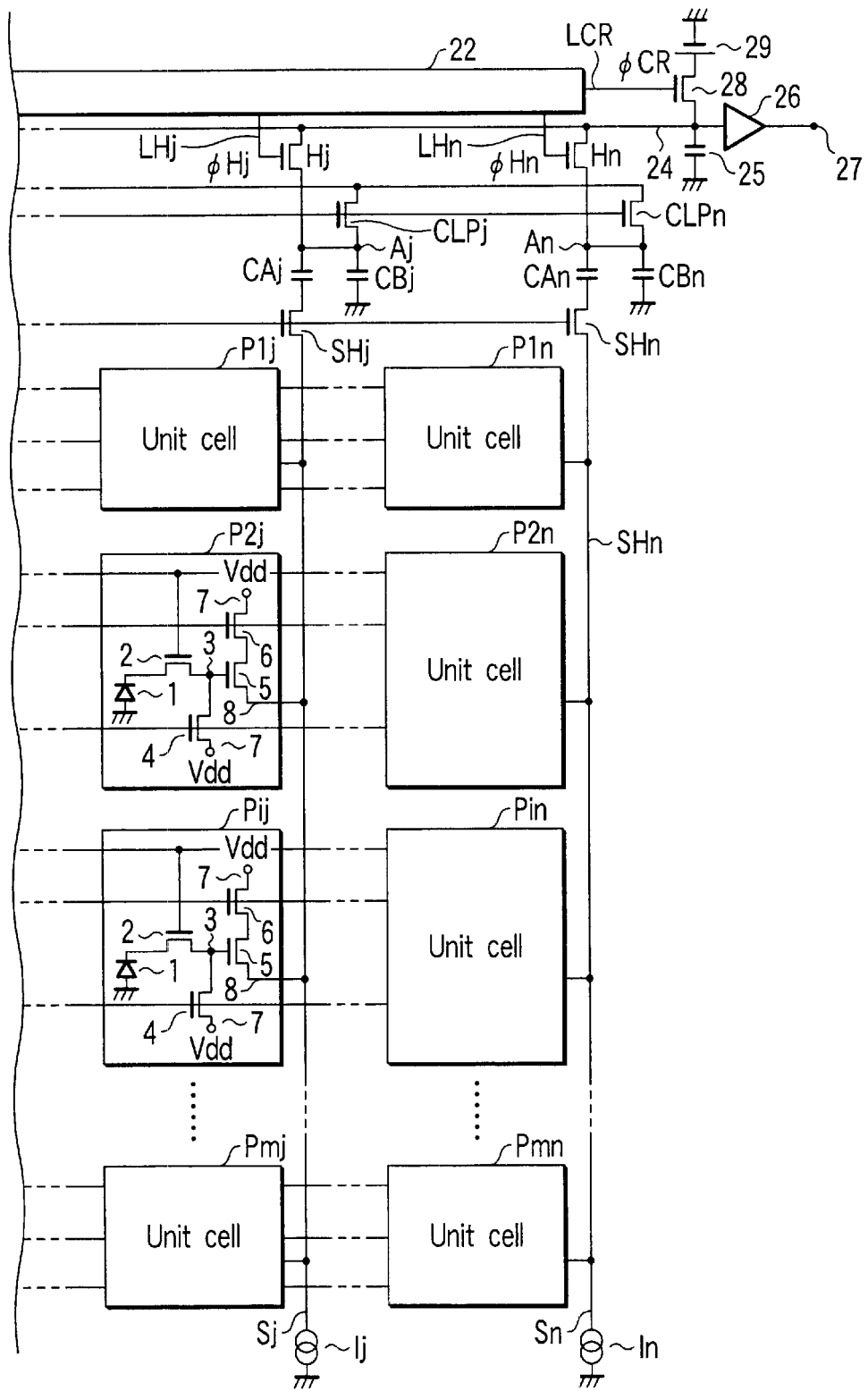

A solid-state imaging device, indicated at 10 in FIGS. 1A and 1B, remains basically unchanged from the conventional solid-state imaging device described in conjunction with FIGS. 8A and 8B, but differs in driving schemes by the horizontal pulse generator that generates pulse signals φHj and φCR. In FIGS. 1A and 1B, therefore, like reference numerals and characters are used to denote corresponding parts to those in FIGS. 8A and 8B.

In FIGS. 1A and 1B, Sj denote vertical signal lines, Ij, current sources, SHj, shift gates, CAj and CBj, capacitances for signal processing, CLPj, clamping gates for removing offset, Hj, line readout gates, LHj, line readout pulse lines, φHj, line readout pulses, LADi, address pulse lines, φADi, address pulses, LRi, readout pulse lines, φRi, readout pulses, LRSi, reset pulse lines, φRSi, reset pulses, LSH, a shift pulse line, φSH, a shift pulse, LCLP, a clamp pulse line, φCLP, a clamp pulse, LCR, a clear pulse line, and φCR, a clear pulse.

In addition, 20 denotes a pulse generator that generates the pulses φADi, φRi, and φRSi; 21, a pulse generator that generates the pulses φSH and φCLP; 23, a clamping DC power supply; 24, a horizontal signal line; 25, a capacitor attached to the horizontal signal line 24; 26, an output buffer circuit that detects the potential on the horizontal signal line and outputs the detected potential with impedance conversion; 27, an output node; 28, a gate for resetting the potential at the capacitor 25; and 29, a power supply for generating a potential at the reset time. The output voltage of the power supply 29 (assumed to be Vb) is set with the characteristic of the output buffer circuit 26 taken into account. A clear pulse φCR is applied to the gate 28 before each of the line readout pulses φHj is applied to a corresponding one of the line readout gates Hj with the result that the capacitor 25 is fixed at Vb.

Figure 6:
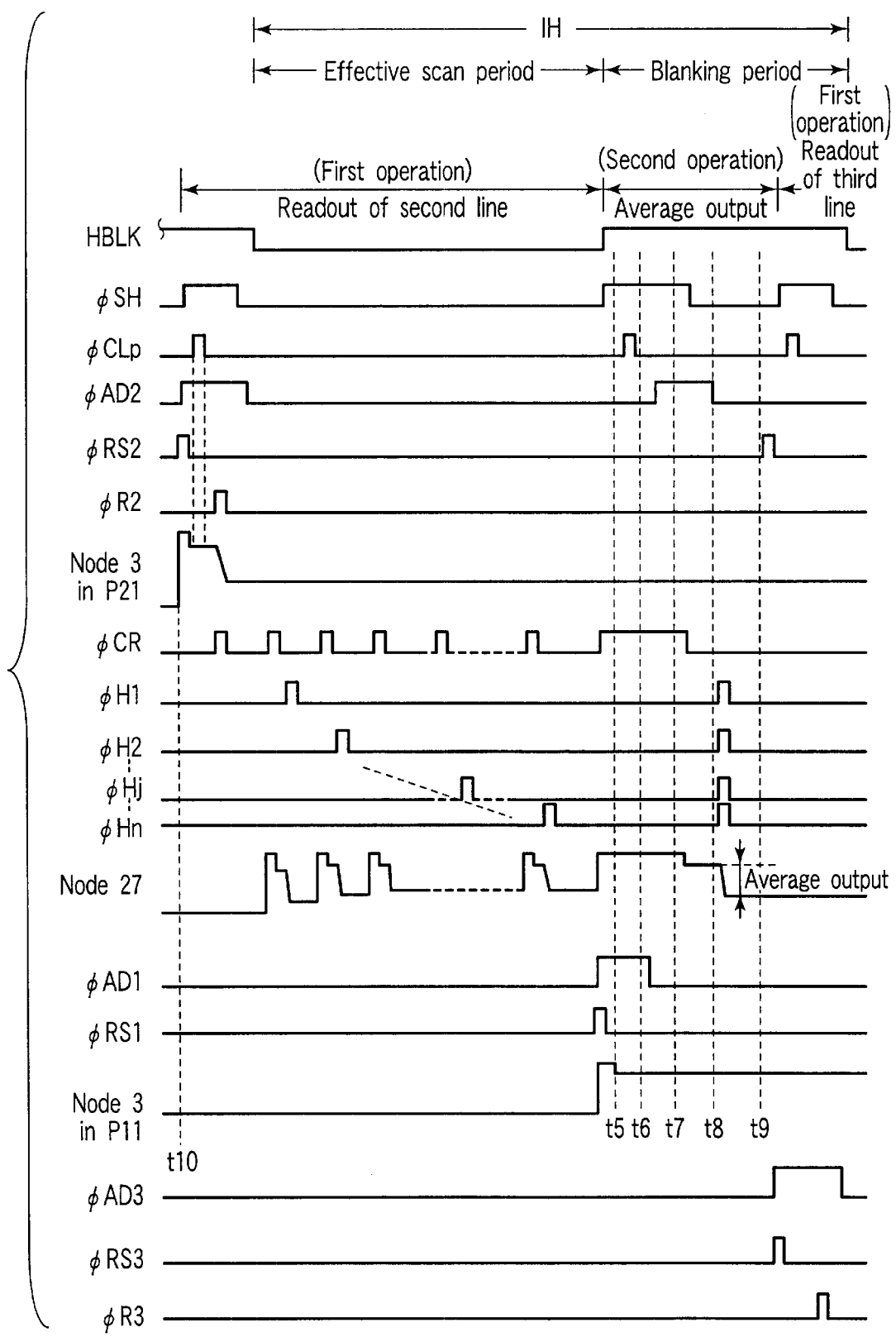
FIG. 6 shows timing waveforms of various pulse signals for use in explanation of an operation of the solid-state imaging device in FIGS. 1A and 1B.

The horizontal pulse generator 220 generates the pulses φHj and φCR so that the imaging device is driven to perform a normal horizontal line read operation (first operation mode) and a read operation (second operation mode) in which outputs in the corresponding line are averaged, within each horizontal line period, as shown in FIG. 6.

In the imaging area on the semiconductor substrate, unit cells Pij are two-dimensionally arrayed in m columns and n rows, the subscript i being the row number from 1 to m and j being the column number from 1 to n. For each row of the unit cells, an address pulse line LADi, a readout pulse line Lri and a reset pulse line LRSi are provided in the horizontal direction. Each unit cell Pij is connected to a pulse generator 20 as vertical driving means to receive an address pulse φADi, a readout pulse φRi, and a reset pulse φRsi over the three pulse lines (the address pulse line LADi, the readout pulse line Lri, and the reset pulse line LRSi). For each column of the unit cells Pij, a vertical signal line Sj is provided in the vertical direction. Each unit cell Pij has its output line 8 connected to a corresponding one of the vertical signal lines Sj.

Each of the vertical signal lines Sj has its one end connected to ground through a corresponding one of current sources Ij and its other end connected to one end of the current path of a corresponding one of shift transistors (shift gates) SHj. The gate of each of the shift transistors SHj is connected in common to a shift pulse line LSH.

The other end of the current path of each of the shift transistors Shj is connected to one plate of a corresponding one of coupling capacitors Caj the other end of which is connected to a horizontal signal line 24 through the current path of a corresponding one of line readout transistors (line readout gates) Hj. The gate of each of the transistors Hj is connected to a corresponding one of line readout pulse lines Lhj. With the horizontal signal line 24 is associated capacitance which is equivalently indicated by a capacitor 25. The other end of each of the coupling capacitors Caj is connected to ground through a corresponding one of charge storage capacitors CBj. Between the junction Aj of corresponding capacitors CAj and CBj and the positive terminal of a clamping DC power supply 23 is connected the current path of a corresponding one of a clamping transistors (clamping gates) CLPj for offset removal. The gate of each of the transistors CLPj is connected to a clamp pulse line LCLP.

The shift transistors SHj, the capacitors CAj and CBj and the clamping transistors CLPj constitute a noise canceling circuit.

The pulse generator 21 provides the shift pulse φSH to the gates of the shift transistors SHj through the shift pulse line LSH and the clamp pulse φCLP to the clamping transistors CLPj through the clamp pulse line LCLP.

A horizontal pulse generator 220 as horizontal drive means provides a line readout pulse φHj to the gate of each of the line readout transistors Hj through a corresponding one of the line readout pulse lines LHj and a clear pulse φCR to the gate of a potential resetting transistor (potential resetting gate) 28 through a clear pulse line LCR. The potential resetting transistor 28 is adapted to reset the potential at a capacitor 25 and has its current path connected at one end to the positive terminal of a DC power supply 29 for producing a resetting potential and at the other end to the horizontal signal line 24. The voltage value of the DC power supply 29 is determined taking the characteristic of an output buffer circuit 26 into consideration. The transistor 28 is supplied at its gate with the clear pulse φCR before the line readout pulses φHj are applied to the line readout transistors Hj, thereby presetting the potential at the capacitor 25 to Vb.

The output buffer circuit 26 has its input connected to the horizontal signal line 24 to detect and output the potential on that line with impedance conversion.

Next, the internal structure of each of the unit cells Pij will be described.

The unit cells Pij are each composed of a photodiode 1 as photoelectric conversion storage means, a readout transistor (readout gate) 2 as charge readout means, a storage node (charge detector) 3 at which a charge read out of the photodiode is temporarily stored, a reset transistor (reset gate) 4 as reset means, a potential detecting transistor (potential detecting gate) 5 as potential detecting means connected to the storage node, an address transistor (address gate) 6 as address means for activating the corresponding cell for potential readout therefrom, a power supply line connected to a power supply node 7 (not shown for the purpose of simplifying illustration), and an output line 8 of the cell.

The photodiode 1 has its anode connected to ground and its cathode connected to one end of the current path of the readout transistor 2, which is connected at the other end of its current path to the storage node 3 and at its gate to the readout pulse line LRi. Between the storage node 3 and the power supply node 7 is connected the reset transistor 4, which has its gate connected to the reset pulse line LRSI. The potential detecting transistor 5 is connected at one end of its current path to the corresponding vertical signal line Sj through the output line 8 and at its gate to the storage node 3. The potential detecting transistor 5 is adapted to detect a charge transferred to the storage node 3 and delivers a potential corresponding to the charge to the vertical signal line Sj over the output line 8. The address transistor 6 has its current path connected between the other end of the current path of the potential detecting transistor 5 and the power supply node 7 and its gate connected to the corresponding address pulse line LADI. The address transistor 6 activates the cell Pij to allow the potential to be read therefrom.

As previously described, the horizontal pulse generator 220 generates the pulses φHj and φCR so that the imaging device is driven to perform a normal horizontal line read operation (first operation mode) and a read operation (second operation mode) in which outputs in the corresponding line are averaged, within each horizontal line period, as shown in FIG. 6.

Figure 9:
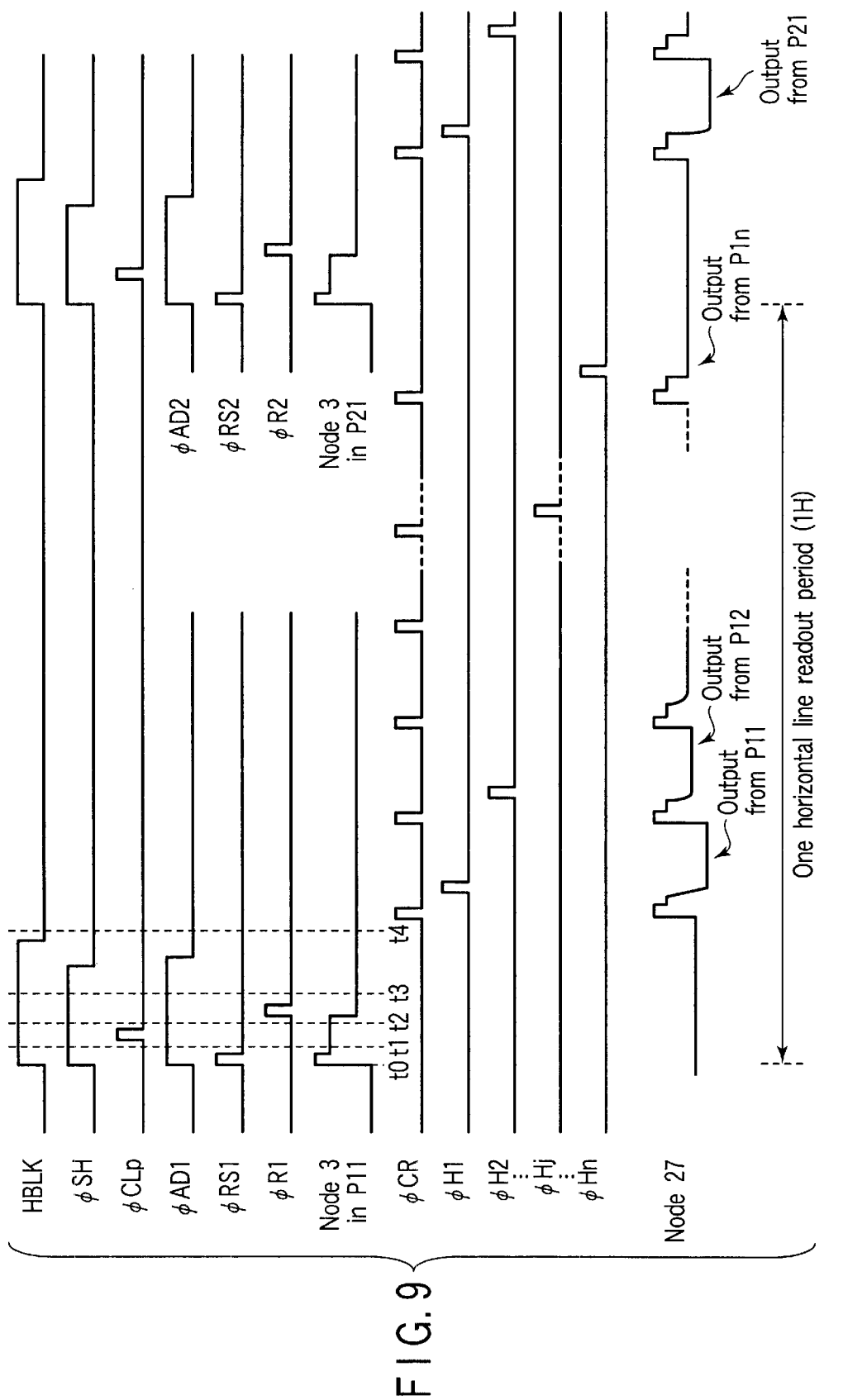
FIG. 9 shows timing waveforms of pulse signals for driving the conventional solid-state imaging device of FIGS. 8A and 8B using a system of non-interlaced scanning.

The first operation mode remains unchanged from the operation previously described with reference to FIG. 9 and hence a detailed description thereof is omitted.

In contrast to the first operation mode, in the second operation mode, during the horizontal line blanking period that follows an effective horizontal line scanning period for a certain line, a read operation is carried out for averaging the outputs for that line. That is, by turning on all the line readout transistors Hj at substantially the same time, a signal whose potential corresponds to the average of the potentials of read signals from all the vertical signal lines Sj appears on the horizontal signal line 24 and is then output to the node 27.

The solid-state imaging device of FIGS. 1A and 1B has an electronic shutter function built in. Solid-state imaging devices that allow for such an electronic shutter operation are normally provided with a pulse generator 30 adapted for electronic shutter in addition to the pulse generators 20, 21 and 220 adapted for signal readout. The pulse generator 30, like the pulse generator 20 as vertical driving means, outputs various pulse signals to scan lines of unit cells at given times. The pulse generators 20 and 30 are each formed of a shift register by way of example. The pulse generators select specific lines two times within one field period.

Before the pulse generator 20 selects lines so that pixel signals are read out onto the vertical signal lines Sj, the pulse generator 30 allows each cell to commence the storage of a pixel signal, thereby allowing an electronic shutter operation for equivalently controlling the exposure time (storage time). The electronic shutter is a well-known technique; hence, a detailed description of its basic arrangement and operation is omitted in this specification.

In the solid-state imaging system of FIGS. 1A and 1B, on the same semiconductor substrate as the solid-state imaging device 10 or a separate semiconductor substrate are provided an amplifier 41 for amplifying an output signal in the first operation mode and a semiconductor memory 42 for temporarily storing average output level data in the second operation mode.

The integrating time of the photoelectric conversion storage means in the unit cells or the gain of the amplifier 41 is controlled for each line in the imaging area in the solid-state imaging device 10 on the basis of the average output level data in the second operation mode. In this case, when the output signal level of the imaging device is above a fixed level, it is reduced to increase the dynamic range.

In setting the integration time for each line in a certain frame period, reference may be made to not only the average output level for that line in the previous frame period but the average output level for the line read prior to that line in the same frame period.

Likewise, in setting the amplifier gain for each line in a certain frame period, reference may be made to not only the average output level for the line read prior to that line in the same frame period but the average output level for that line or the line read prior to that line in the previous frame period.

In some cases, it is desired to set the integration time or amplifier gain to vary gently from line to line, instead of setting the integration time or amplifier gain using the average output level for each line as it is.

For example, let the integration time for the previous line be T and a percentage setting be 20%. By setting the integration time to range from 0.8 T to 1.2 T, in other words, by setting the integration time for each line on the basis of a value obtained by correcting the magnitude of the average output level in the second operation mode according to a given compression characteristic, expansion of the dynamic range and faithfulness in contrast can be made compatible with each other.

FIG. 2 is a flowchart illustrating a specific example of a method of setting the integration time for each line in the solid-state imaging device.

In this method, after one line has been read in a certain frame period, the average output level in that line is stored and then the integration time for the corresponding line in the next frame period is set based on that average output line.

In other words, when one line in a certain image is read out, the integration time is set on the basis of stored average output level data in the second operation mode for the corresponding line in an image of one frame before and, when the average output level is in excess of a fixed level, the output level is controlled.

Thus, by setting independently the integration time for each line on the basis of the average output level in the corresponding line of one frame period before, the dynamic range can be expanded on a line-byline basis without making the arrangement of the solid-state imaging device 10 more complex than necessary.

Instead of setting the integration time for each line, it is also possible to set the amplifier gain independently on the basis of the average output level for the corresponding line of one frame period before.

A second embodiment of the present invention will be described hereinafter.

In the first embodiment, an operation of normally reading a horizontal line (first operation mode) and an operation of obtaining the average output level in that line (second operation mode) are performed during each horizontal line period within one frame period. Such a frame period is repeated.

In the second embodiment, there are (a) normal frame periods in which each line in the imaging area is read normally and (b) a preliminary frame period in which the average output level is read for each line.

Figures 4, 7:
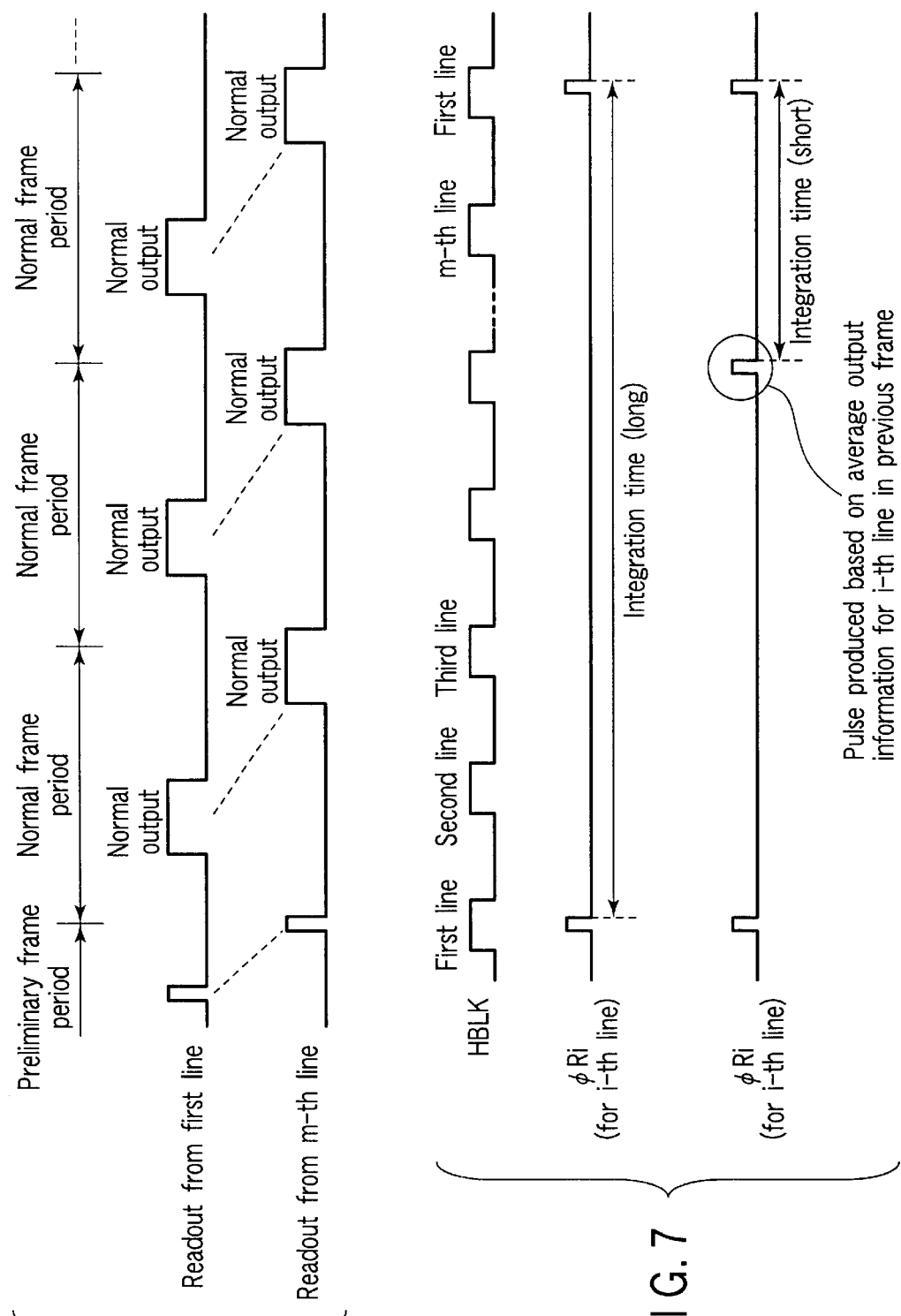
FIG. 4 is a timing diagram for use in explanation of the operation illustrated by the flowchart of FIG. 3.
FIG. 7 is a timing diagram for use in explanation of an example of a control operation for the integration time of each line in the solid-state imaging device of FIGS. 1A and 1B.

FIGS. 3 and 4 are a flowchart and a timing diagram, respectively, which illustrate a specific example of a method of setting the integration time for each horizontal line in the solid-state imaging device in accordance with the second embodiment.

During each normal frame period, in the effective scanning interval within each horizontal line period, the first operation mode is carried out in which the line readout switches, one for each vertical signal line, are turned on in sequence by horizontal driving means and consequently output signals of the signal processing circuit are outputted in sequence over the horizontal signal line to the output node. In this case, there is no need of performing the second operation mode. The operation during the normal frame period remains the same as hitherto.

In contrast, in the preliminary frame period, the second operation mode is carried out in which the line readout switches are simultaneously turned on by the horizontal driving means for each line, then output signals of the cells arranged in a horizontal line are read out simultaneously onto the horizontal signal line for averaging the output signals corresponding to that horizontal line, and the average output signal for that horizontal line is output to the output node. In this case, there is no need of performing the first operation mode. The preliminary frame period can be set much shorter than the normal frame period.

The integration time of the photoelectric conversion means in the unit cells for each horizontal line in each normal frame period is set based on the average output level for the corresponding horizontal line detected in the second operation mode in the previous preliminary frame period.

In this case, no normal image signal is obtained during the preliminary frame period, resulting in loss of a normal picture frame. By repeating the normal frame period a number of times subsequent to the preliminary frame period, the effect of loss of a normal picture frame due to the insertion of the preliminary frame period can be almost neglected. For example, with a system that, like supervisory cameras, captures relatively slowly varying images, alternately repeating the preliminary frame period and the normal frame period hardly offers any problem.

Thus, by setting the integration time for each horizontal line in one frame period on the basis of the average output level in the corresponding horizontal line of k (an integer of one or more) frame periods before, the dynamic range can be expanded on a line-by-line basis without making the solid-state imaging device 10 more complex than necessary.

Instead of setting the integration time for each horizontal line, the amplifier gain may be set for each line on the basis of the average output level in the corresponding horizontal line of k frame periods before.

A third embodiment of the present invention will be described below.

FIG. 5 is a flowchart illustrating an example of a procedure of setting the gain of the amplifier 41 in FIGS. 1A and 1B for each horizontal line.

In this procedure, in amplifying an output signal in the first operation mode in the amplifier 41, the amplifier gain for a horizontal line which is read in the first operation mode during one frame period is controlled based on stored average output level data in the second operation mode for the adjacent horizontal line of one line before that horizontal line and the output level is decreased when the brightness is at a fixed level or more.

Thus, by detecting the brightness of a subject image on the adjacent line for each line and setting the amplifier gain (corresponding to the camera stop setting) for each line in real time when the brightness is at a fixed level or more, the flicker can be reduced.

Instead of controlling the gain of the amplifier 41, the gain of the output buffer 26 or the capacitance of the capacitor 25 may be made variable.

FIG. 6 is a diagram for use in explanation of an operation of the solid-state imaging device 10 in FIGS. 1A and 1B and illustrates the timing of various pulse signals in reading a selected line (e.g., the second horizontal line 2).

FIG. 7 shows the timing of various pulse signals to illustrate an example of an integration time control operation for each line in the solid-state imaging device 10 in FIGS. 1A and 1B.

In the timing diagram of FIG. 6, in the period in which the first operation mode is carried out, signals are read from the horizontal line 2. In this case, during the horizontal blanking period, charges from cells in the horizontal line 2 are transferred onto the vertical signal lines and, during the horizontal effective scanning period, charges from the pixels in the horizontal line 2 are output in sequence to the output node 27.

Within the horizontal blanking period that follows the horizontal effective scanning period, the second operation mode is carried out to detect the average output level in the horizontal line 2 (light intensity or brightness on the horizontal line 2 in the imaging surface). The detected average output level for the horizontal line 2 is stored to determine a proper storage time (shutter speed) for the horizontal line 2 in subsequent frames or a proper stop setting for the next horizontal line to the line 2 in the corresponding frame.

The operation of the solid-state imaging device 10 in FIGS. 1A and 1B will be described in detail below with reference to FIGS. 6 and 7.

In each unit cell in FIGS. 1A and 1B, charges resulting from photoelectric conversion of light incident on the photodiode 1 are stored in it until the readout transistor 2 is turned on.

First, the operation pertaining to the horizontal line 2 in the horizontal line blanking period will be described.

At time t=t10, the address pulse φAD2 is set high to turn on the address transistors 6 and the shift pulse φSH is set high to turn the shift transistors SHj on. Thereby, a source follower circuit is formed by the corresponding vertical signal line Sj, current source Ij and potential detecting transistor 5 and as a result only the potential determined by the gate potential of the transistor 5 corresponding to the amount of charge at the storage node 3 is transferred onto the corresponding vertical signal line Sj.

At time t=t10, the reset pulse φRS2 is also set high to turn the reset transistor 4 on, whereby dark-current-based charges previously stored at the storage node 3 are drained away. This allows the storage node to be set to the supply voltage (Vdd). This high voltage is then detected by the transistor 5 to raise the potential on the vertical signal line Sj to a high level corresponding to Vdd.

Next, the reset pulse φRS2 is set low with the address pulse φAD2 and the shift pulse φSH kept at the high level, thereby terminating the reset operation. At this time, the reset transistor 4 is turned off to thereby disconnect the storage node 3 from the power supply node 7, lowering the potential on the vertical signal line Sj through coupling.

Next, the clamp pulse φCLP is set high to turn on the clamping transistors CLPj, whereby a given voltage is applied from the power supply 23 to one plate of each of the capacitors CAj and CBj, thereby eliminating offset.

Next, the readout pulse φR2 is set high to turn the readout transistor 2 on, whereby charges Qij stored in the photodiode 1 are transferred to the storage node 3. Thereby, the nodes Aj in the noise canceller are set trough the vertical signal lines Sj to potentials corresponding to pixel signals from the corresponding cells.

After that, the shift pulse φSH is set low to turn off all the shift transistors SHj, so that the nodes Aj are disconnected from the vertical signal lines Sj and the unit cells Pij.

Next, the operation relating to the horizontal line 2 in the horizontal effective scanning period subsequent to the horizontal line blanking period will be described.

The clear pulse φCR from the pulse generator 220 is set high to turn the reset transistor 28 on. At this time, since all the horizontal readout pulses φHj are at a low level, all the horizontal readout transistors Hj are in the off state, so that the potential on the horizontal signal line 24 is set at a given level depending on the voltage of the DC power supply 29. After that, the clear pulse φCR is set low to turn the reset transistor 28 off, thereby disconnecting the horizontal signal line 24 from the DC power supply 29.

Next, each of the horizontal readout pulses φH1, φH2, φH3, ... is set high in sequence with the clear pulse φCR set temporarily high before it is set high, thereby turning on each of the readout transistors H1, H2, H3, ... in sequence. As a result, pixel signals from the horizontal line 2 are obtained in time sequence from the output node 27 to provide a line of video information.

Next, the operation in the horizontal blanking period in the next horizontal line period H subsequent to the above operation relating to the horizontal line 2 will be described.

First, to set the potential on the output line 8 to a reference value, the next processing is performed using the first horizontal line 1 for which signal readout has been completed. That is, the shift pulse φSH is set high to turn on the shift transistors SHj, and the reset pulse φRS1 is set high to turn on the reset transistor 4, thereby draining dark-current-based charges stored at the storage node 3 away. At the same time, the address pulse φAD1 is set high for a fixed period to turn the address transistor 6 on. Thereby, a source follower circuit is formed by the vertical signal line Sj, the current source Ij and the potential detecting transistor 5, so that only the potential determined by the gate potential of the transistor 5 corresponding to the amount of charge at the storage node 3 is transferred to the corresponding vertical signal line Sj.

Next, the clamp pulse φCLP is set high to turn on the clamping transistors CLPj, whereby the supply voltage from the DC power supply 23 is applied to one plate of each of the capacitors CAj and CBj.

At the same time the shift pulse φSH is set high, the clear pulse φCR is set high to turn on the reset transistor 28. At this time, since all the horizontal readout pulses φHj are low, all the line readout transistors Hj are off, so that the potential on the horizontal signal line 24 is determined by the voltage of the DC power supply 29. Thus, the output node 27 is set to a potential corresponding to the potential on the signal line 24.

Next, an operation of detecting the average output level for the horizontal line 2 is performed. In this operation, the address pulse φAD2 is set high again for a fixed interval to turn on the address transistor 6. As a result, the potential corresponding to the amount of charge Qij read out onto and stored at the storage node 3 in each of the unit cells Pij in the horizontal line 2 is transferred again to the corresponding node Aj through the corresponding output line 8 and vertical signal line Sj. In this state, the clear pulse φCR is set low to turn off the reset transistor 28, thus disconnecting the horizontal signal line 24 from the DC power supply 29. After that, all the line readout pulses φH1, φH2, φH3, ... are set high to turn on all the line readout transistors H1, H2, H3, ..., allowing charges stored at the capacitors CAj and CBj to be transferred onto the horizontal signal line 24. As a result, the potential on the horizontal signal line 24 changes by ΔA according to the average of the amounts of charge stored at the capacitors CAj and CBj, allowing the output node 27 to have a potential corresponding to the average of the amounts of charges stored at the storage nodes 3 in the unit cells P2j arranged in the horizontal line 2.

The average output level data thus obtained for the horizontal line 2 is stored for subsequent storage time setting (or stop setting) for the horizontal line 2 in the next frame.

Next, a transition is made from the second operation mode to the first operation mode to output pixel signals from the adjacent third horizontal line 3 in time sequence.

The addition of the second operation mode in the horizontal line blanking period makes the blanking period somewhat longer than in the prior art; however, making the operating clocks higher in frequency allows the blanking period to be substantially the same as with the prior art.

In the solid-state imaging system thus far described, a straightforward driving scheme is used which selects all the vertical signal lines Sj in the solid-state imaging device 10 at substantially the same time; therefore, output signals of signal processing means attached to the vertical signal lines Sij can directly be read out onto the horizontal signal line 24, allowing output signals for the same horizontal line to be averaged. Using the average output level for each horizontal line, the integration time for the corresponding horizontal line in the next frame or the amplifier gain for the adjacent horizontal line to be read next is controlled.

Without making more complex than necessary the circuit arrangement of the solid-state imaging device 10 in comparison with the system in which the integration time is determined on a pixel-by-pixel basis, therefore, the dynamic range can be expanded with higher packing densities.

Next, the reason why in the second operation mode the average signal can be obtained for each horizontal line will be described in detail with reference to FIGS. 1A, 1B and 6.

Assume now that, in the horizontal effective scanning period for the horizontal line 2, the unit cells P21, P22, ..., P2n all have already been read from. In the subsequent blanking period, the address pulse φAD1 for the first horizontal line 1 is set high to open the address gate 6 and the reset pulse φRS1 is set high to open the reset gate 4. At time t=t5, immediately after the pulses φAD1 and φRS1 were set high, the potential Vsj on the vertical signal line Sj becomes $$Vsj = mVdd + Vo1j \quad (10)$$

where m is the modulation factor of transistors 5 and Vo1j is the offset voltage determined by the threshold voltage of the transistor 5 and variations in the current sources Ij.

When the clamp pulse φCLP is set high to open the clamp gates CLPj, the potential difference across the capacitance CAj becomes $$Vref - (mVdd + Vo1j)$$

The node of the capacitance CBj opposite to the grounded node is at Vref (t=t6).

Next, control is returned to the horizontal line 2. The address pulse φAD2 is set high and opens the address gate 6. At time t=t7, the potential Vsj on the vertical signal line Sj becomes $$Vsj = (mQ2j/C2j) + mVdd + Vo2j \quad (11)$$

Thus, VAj is set as follows:

$$VAj = Vref + \{(mQ2j/C2j) + mVdd + Vo2j - Vo1j\} \times CAj/(CAj + CBj) \quad (12)$$

After that, the shift gates SHj are closed to disconnect the vertical signal lines Sj. In this state, let charges stored at the capacitances 25 and CBj at time t=t8 be Q1 and Q2j, respectively. Then, Q1 and Q2j are given by $$Q1 = CH \cdot Vb \quad (13)$$

$$Q2j = CBj \cdot VAj$$

$$= CBj Vref + \{(mQ2j/C2j) + Vo2j - Vo1j\} \times CAj \cdot CBj/(CAj + CBj) \quad (14)$$

Next, all the line readout gates Hj are opened at the same time, so that the potential V24 on the horizontal signal line 24 at time t=t9 becomes $$V24=(Q1+\Sigma Q2j)/(CH+\Sigma CBj)$$

$$=(CH\cdot Vb+\Sigma Vref\cdot CBj)/(CH+\Sigma CBj)+[\{\Sigma(mQ2j/C2j)+Vo2j-Vo1j\}CAj\cdot CBj/(CAj+CBj)]/(CH+\Sigma CBj) \quad (15)$$

where $\Sigma$ is the sum taken over j from 1 to n.

As previously described, the capacitance ratios in equation (15) can be made to correspond with their respective geometrical sizes that can be controlled precisely. With this in mind, eliminating j from CAj and CBj yields $$V24=(CH\cdot Vb+nVref\cdot CB)/(CH+nCB)+CA\cdot CB/(CA+CB)\{\Sigma(mQ2j/C2j)+Vo2j-Vo1j\}/(CH+nCB) \quad (16)$$

That is, V24 contains a fixed component of (CH·Vb+ nVref·CB)/(CH+nCB) and an average signal component multiplied by a constant. If nCB is much larger than CH, then V24 is approximated by $$V24=Vref+\{CA/(CA+CB)\}(1/n)\{\Sigma(mQ2j/C2j)+Vo2j-Vo1j\} \quad (17)$$

Further, Vo2j31 Vo1j is sufficiently small because of adjacent cells. By neglecting this, V24 becomes $$V24=Vref+\{CA/(CA+CB)\}(1/n)\Sigma mQ2j/C2j \quad (18)$$

From this equation, it can be seen that the average signal component, $(1/n)\Sigma mQ2j/C2j$, appears on the horizontal signal line 24 at the time shown in FIG. 6. Equation (18) corresponds to one in which, in equation (9), CH and mQij/Cij are replaced by CH=0 and $(1/n)\Sigma mQ2j/C2j$, the average over one horizontal line, respectively.

An example of a conventional technique of averaging signals read from a plurality of vertical signal lines and outputting the resulting signals is disclosed in Japanese Unexamined Patent Publication No. 10-4520, by which each of outputs of photodiodes arranged in the same horizontal line is scanned and output in sequence (the high-resolution read mode) and each of average outputs of every two adjacent photodiodes is scanned and output in sequence (the fast read mode).

The solid-state imaging system of the present invention differs from the prior art technique in that output signals from all the vertical signal lines are averaged and in the way of implementation thereof. That is, in the present invention, each of the horizontal line readout transistors (switches) has its current path connected at its one end to the output of signal processing means corresponding to a respective one of the vertical signal lines and at its other end connected in common to the horizontal signal line and has its gate connected to receive a respective one of output signals from the horizontal driving means. In the first operation mode, the horizontal line readout transistors are turned on in sequence and, in the second operation mode, they are turned on at substantially the same time. Therefore, the solid-state imaging device of the present invention allows the second operation mode to be carried out using the existing horizontal line readout transistors as they are and hence has the advantage of being simple in arrangement in comparison with the prior art solid-stage imaging device.

According to the solid-state imaging system of the present invention, as described above, the dynamic range can be expanded on a line-by-line basis without making more complex than necessary the arrangement of the solid-state imaging device.

In addition, the expansion of dynamic range and the faithfulness of contrast can be made compatible with each other.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A solid-state imaging system comprising:
   a solid-state imaging device having:
      an imaging area in which unit cells are arrayed in rows and columns on a semiconductor substrate, each unit cell having a photoelectric conversion storage element for converting an incident light into the form of an electric charge and storing the produced charge, a charge readout element for readout of the charge stored in the photoelectric conversion storage element, a charge detecting element for detecting the amount of charge readout by the charge readout element, and an address element for activating the charge detecting element;
      a vertical driving circuit for driving the charge readout element and the address element of the unit cells for each row of unit cells;
      signal processing circuits each provided for a respective one of vertical signal lines each arranged for a respective one of the columns of unit cells;
      horizontal line readout switches each provided for a respective one of the vertical signal lines, for controlling a transfer of an output signal of the corresponding signal processing circuit to a horizontal signal line;
      a horizontal driving circuit for controlling the horizontal line readout switches to allow the transfer of output signals of the signal processing circuits to the horizontal signal line; and
      an output circuit for outputting the output signals of the signal processing circuits read out onto the horizontal signal line under the control of the horizontal driving circuit,
   the solid-state imaging device having a first operation mode in which the horizontal driving circuit turns on the horizontal readout switches in sequence during an effective scanning period in a horizontal line period so that the output signals of the signal processing circuits are outputted in sequence through the horizontal signal line from the output circuit and a second operation mode in which the horizontal driving circuit turns on the horizontal readout switches at substantially the same time so that output signals of the signal processing circuits read out through the switches onto the horizontal signal line are averaged to form a signal of an average level for each row of unit cells and the signal of the average level is outputted from the output circuit;
   an amplifier for amplifying output signals in the first operation mode outputted from the output circuit; and
   a storage circuit for storing data of the average level of the signal in the second operation mode outputted from the output circuit for each row of unit cells,
   the gain of the amplifier being set for each row of unit cells on the basis of the signal of the average level in the second operation mode,
   wherein the second operation mode is carried out during a blanking period subsequent to the effective scanning period, and when amplifying output signals from each row of unit cells in the first operation mode in the amplifier, the gain of the amplifier is set based on the signal of the average level in the second operation mode for the adjacent row of one row before that row in the same frame.

2. The solid-state imaging system according to claim 1, wherein the integration time for each row of unit cells is set based on a value obtained by correcting the corresponding average output level in the second operation mode according to a predetermined compression characteristic.

3. A solid-state imaging system comprising:

a solid-state imaging device having:
  an imaging area in which unit cells are arrayed in rows and columns on a semiconductor substrate, each unit cell having a photoelectric conversion storage element for converting an incident light into the form of an electric charge and storing the produced charge, a charge readout element for readout of the charge stored in the photoelectric conversion storage element, a charge detecting element for detecting the amount of charge readout by the charge readout element, and an address element for activating the charge detecting element;
  a vertical driving circuit for driving the charge readout element and the address element of the unit cells for each row of unit cells;
  signal processing circuits each provided for a respective one of vertical signal lines each arranged for a respective one of the columns of unit cells;
  horizontal line readout switches each provided for a respective one of the vertical signal lines, for controlling a transfer of an output signal of the corresponding signal processing circuit to a horizontal signal line;
  a horizontal driving circuit for controlling the horizontal line readout switches to allow the transfer of output signals of the signal processing circuits to the horizontal signal line; and
  an output circuit for outputting the output signals of the signal processing circuits read out onto the horizontal signal line under the control of the horizontal driving circuit, the solid-state imaging device having a first operation mode in which the horizontal driving circuit turns on the horizontal readout switches in sequence during an effective scanning period in a horizontal line period so that the output signals of the signal processing circuits are outputted in sequence through the horizontal signal line from the output circuit and a second operation mode in which the horizontal driving circuit turns on the horizontal readout switches at substantially the same time so that output signals of the signal processing circuits read out through the switches onto the horizontal signal line are averaged to form a signal of an average level for each row of unit cells and the signal of the average level is outputted from the output circuit;

an amplifier for amplifying output signals in the first operation mode outputted from the output circuit; and a storage circuit for storing data of the average level of the signal in the second operation mode outputted from the output circuit for each row of unit cells, the gain of the amplifier being set for each row of unit cells on the basis of the signal of the average level in the second operation mode, wherein the second operation mode is carried out during a blanking period subsequent to the effective scanning period, and when amplifying output signals from each row of unit cells in the first operation mode in the amplifier, the gain of the amplifier is set based on the signal of the average level in the second operation mode for the adjacent row of one row before that row in the same frame, and the integration time for each row of unit cells is set based on a value obtained by correcting the corresponding average output level in the second operation mode according to a predetermined compression characteristic.

* * * * *